(12) United States Patent
Liesener et al.

(10) Patent No.: US 11,077,832 B2
(45) Date of Patent: Aug. 3, 2021

(54) KEY FOR OPENING AND STARTING A VEHICLE AND A METHOD FOR CLEANING AN OUTER ELEMENT OF A VEHICLE

(71) Applicant: MOTHERSON INNOVATIONS COMPANY LIMITED, London (GB)

(72) Inventors: Alf Liesener, Stuttgart (DE); Stefanie Göttlicher, Stuttgart (DE)

(73) Assignee: MOTHERSON INNOVATIONS COMPANY LIMITED, London (GB)

( * ) Notice: Subject to any disclaimer, the term of this patent is extended or adjusted under 35 U.S.C. 154(b) by 0 days.

(21) Appl. No.: 16/130,632

(22) Filed: Sep. 13, 2018

(65) Prior Publication Data

US 2019/0077379 A1 Mar. 14, 2019

(30) Foreign Application Priority Data

Sep. 14, 2017 (DE) ...................... 10 2017 121 390.2

(51) Int. Cl.
*E05B 19/00* (2006.01)
*B60S 1/56* (2006.01)

(52) U.S. Cl.
CPC ................ *B60S 1/56* (2013.01); *E05B 19/00* (2013.01)

(58) Field of Classification Search
CPC . E05B 19/00; B60S 1/56; B60S 1/026; B60Q 9/00; G05D 1/0088; B43K 29/00; B08B 1/00

(Continued)

(56) References Cited

U.S. PATENT DOCUMENTS 2,630,212 A * 3/1953 Mosch ................... A45D 29/20
132/317
5,615,441 A * 4/1997 Savini .................... A44C 25/00
15/111

(Continued)

FOREIGN PATENT DOCUMENTS

DE 102016215523 A1 2/1918
DE 1985067 U 5/1968

(Continued)

OTHER PUBLICATIONS

German Office Action dated Jun. 13, 2018 of German application No. 10 2017 121 390.2.

(Continued)

*Primary Examiner* — Suzanne L Barrett
*Assistant Examiner* — Suzanne D Barrett
(74) *Attorney, Agent, or Firm* — Jones Day

(57) ABSTRACT

A key device for opening or starting a vehicle includes a main body, and at least one cleaning means which is in or on the main body for cleaning an optical element of a rear view device of the vehicle. Further, a method is provided for cleaning an outer element of a vehicle, in particular at least one optical element of a rear view device of a motor vehicle by detecting a contamination state including a predetermined degree of contamination or a predetermined type of contamination of the outer element, emitting at least one signal that is characteristic for the detected degree of contamination including an input signal for a key device, and transmitting an optically, acoustically, or haptically detectable output signal by the key device, with a request for cleaning using the at least one cleaning means of the key device or which is connectable with the key device.

12 Claims, 2 Drawing Sheets

(58) Field of Classification Search
USPC .............................. 70/431, 408, 456 R–459
See application file for complete search history.

(56) References Cited

U.S. PATENT DOCUMENTS

| | | | | |
|---|---|---|---|---|
| 5,956,985 | A * | 9/1999 | Chang ................. | A44B 15/005 116/DIG. 1 |
| 6,141,999 | A * | 11/2000 | Whittaker ............ | A44B 15/005 15/111 |
| 2001/0029416 | A1* | 10/2001 | Breed .................. | B60R 22/321 701/45 |
| 2004/0033788 | A1* | 2/2004 | Price ................... | H04B 1/3888 455/100 |
| 2004/0212338 | A1* | 10/2004 | Shimizu ............... | H02H 7/0851 318/469 |
| 2006/0055509 | A1* | 3/2006 | Teshima ............... | B60R 25/255 340/5.53 |
| 2015/0004352 | A1* | 1/2015 | Sohn .................... | A47K 10/02 428/99 |
| 2015/0105942 | A1* | 4/2015 | Lee ...................... | B60S 1/0833 701/2 |
| 2017/0341611 | A1* | 11/2017 | Baker .................. | B60R 25/305 |

FOREIGN PATENT DOCUMENTS

| | | |
|---|---|---|
| DE | 202009012451 U1 | 2/2010 |
| DE | 102011082546 A1 | 3/2013 |

OTHER PUBLICATIONS

Chinese Office Action dated Oct. 12, 2020 of Chinese application No. 201811068516.4.

* cited by examiner

KEY FOR OPENING AND STARTING A VEHICLE AND A METHOD FOR CLEANING AN OUTER ELEMENT OF A VEHICLE

CROSS-REFERENCE TO RELATED APPLICATIONS

This application claims the benefit of foreign priority to German Patent Application No. DE 10 2017 121 390.2, filed Sep. 14, 2017, which is herein incorporated by reference in its entirety for all purposes.

BACKGROUND

1. Field of the Invention

The following description relates to a key for opening and/or starting a vehicle such as a motor vehicle, and a method for cleaning an outer element such as an outer camera of a vehicle.

2. Related Art

German Utility Application No. DE 20 2009 012 451 U1 describes a rolled up cleaning cloth integrated into an article, which can be pulled out for cleaning purposes. The article can have the function of a writing pen or a bag, and among other things be designed as a keyring. However, the cleaning cloth with its roll-up mechanism requires a large amount of space, so that an application as a key ring is not generally used.

In a modern motor vehicle, outer cameras are increasingly being used which are designed to provide the driver of the motor vehicle with additional visual information regarding the area surrounding the motor vehicle, or which are intended to serve as information sources for driver assistance systems. These are for example rear cameras, rear view cameras, which if necessary can also replace and/or supplement an outer rear mirror of the motor vehicle, front view cameras as a data source for a driver assistance system, and so on.

If a lens or protective glass of such an outer camera becomes dirty, the driver or the driver assistance system can no longer be provided with sufficiently good visual information in order to guarantee safe operation of the motor vehicle. It would be desirable if such outer elements of a vehicle could be quickly and easily cleaned.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a key for opening and/or starting a vehicle such as a motor vehicle makes it easier for a user of the vehicle to clean outer elements of the vehicle.

In an aspect, a key device for opening and/or starting a vehicle includes a basic body, in or on which, at least at times, at least one means is provided for cleaning, in particular for cleaning an optical element, of a rear view device of the vehicle.

A receiving unit may receive at least one wireless transmitted input signal emitted from the vehicle, which provides information about a degree of contamination of the optical element, and/or an transmitting unit for transmitting at least one output signal, which provides information about a degree of contamination of the optical element, preferably depending on the input signal.

The transmitting unit may have at least one lamp, one loudspeaker and/or means for bringing the basic body into a vibrating state.

The means for cleaning may have a container with a cleaning fluid, whereby the container is preferably replaceable, and/or the means for cleaning has at least one unit for applying cleaning fluid, preferably including a nozzle, a valve and/or a pump.

The unit for applying the cleaning fluid may be hidden at least in sections in the basic body in a basic state and can be moved out of the basic body at least partially, preferably automatically depending on the input signal, in order to create an operating state.

The fill level of the container with a cleaning fluid may be determinable and/or a fill request may be transmitted, preferably depending on the specific fill level and/or the transmitting unit.

The means for cleaning may have at least one means for the mechanical rubbing off of dirt, preferably including a cloth and/or a brush and/or a wiper lip.

The means for the mechanical rubbing off of dirt can be hidden at least in sections in the basic body in a basic state and can be moved out of the basic body at least partially, preferably automatically depending on the input signal, in order to create an operating state.

An abrasion of the means for the mechanical rubbing off of dirt may be determinable and/or a signal relating to the abrasion of the means for mechanical rubbing off of dirt may be transmitted, particularly in the form of a request for replacement, preferably via the transmitting unit.

At least a part of the means for cleaning may be moved to the operating state under the influence of a mechanical and/or electric actuation unit and/or under the influence of a return device, preferably with a spring, is transferable back into the basic state from the usage state.

At least a part of the means for cleaning may be detachable from the basic body and/or is affixable to the basic body.

The key device may include at least one key respectively that is insertable into a lock, at least one mechanical actuation means for effecting the opening and/or closing of the vehicle by means of wireless transmitted signals, detection means for the, in particular automatic, recognition of a pre-determined vehicle and for effecting the opening of said vehicle, a digital key, in particular a smartphone with a digital key function, and/or an automatic signal transmission unit for detecting the key device by a pre-determined vehicle.

The key device for opening and/or putting into operation a vehicle may thus include a basic body in or on which, at least at times, at least one means is provided for cleaning, in particular for cleaning an outer element of a vehicle such as an optical element, of a rear view device of the vehicle. Through the integration of the means for cleaning into the key device, the driver reaching their car who notices contamination of an outer element that is important for operation does not first need to open the vehicle and remove cleaning agent from it, but can directly use their key device for cleaning. Thus, they are not prevented by the necessity of a cumbersome procedure from cleaning the element. The operating safety during driving can thus be increased.

The key device may include a receiving unit for receiving a wireless transmitted input signal emitted from the vehicle, which provides information about a degree of contamination of an element of the vehicle, and an transmitting unit for transmitting an output signal, with the pre-determined degree of contamination of the element that is transmitted by the input signal. In this manner, the vehicle itself can cause the driver to clean the outer element, precisely when they approach the vehicle or it is detected in another manner that they wish to drive off (for example when they take hold of a door handle): the vehicle issues a signal and the driver is informed that the outer element should be cleaned, so that they do not first have to open the vehicle and remove cleaning agent from it, but can directly use their key device for cleaning.

The transmitting unit may have a lamp, a loudspeaker and/or means for bringing the basic body into a vibrating state. Thus, through one suitable sense or through several different senses, attention can be drawn to the contamination of the outer element.

The cleaning means may have a container with a cleaning fluid. A cleaning fluid can contain a suitable washing agent, e.g. tenside. Instead, simple (compressed) air can also be issued. The container is preferably replaceable, for example is designed in the form of a cartridge. In this variant, there is preferably integrated means for applying the cleaning fluid from the container. With a cleaning fluid, the cleaning means can work through additional compressed air, or however also be designed as a pump, i.e. the basic body can for example be elastically springy, and through pressure applied to it, the cleaning fluid is pressed out. If ambient air is used as cleaning fluid, a pump can be used with an inlet valve for letting in air when a pump body (made of rubber, etc.) or the basic body relaxes.

The cleaning means for cleaning may have at least one means for the mechanical rubbing off of dirt, preferably a cloth and/or a brush and/or a wiper lip. Such means are better suited for cleaning certain types of dirt than a fluid. Preferably, it is hereby provided that the means for the mechanical rubbing off of dirt is hidden at least in sections in the basic body in a basic state and can be moved out of the basic body in order to create an operating state. As a result, the cleaning means, which are used only occasionally, do not intrude, or hardly intrude at all, during everyday operation.

The means for the mechanical rubbing off of dirt may be movable into the operating state under the influence of a mechanical actuation unit (pressing on the basic body, pressing out of the means) and/or an electrical actuation unit (pressing on a switch, electrical release or moving out of the means). Further, in a suitable manner, the means for the mechanical rubbing off of dirt may be transferable back from the usage state into the basic state under the influence of a return device, preferably with a spring, so that they do not further intrude on everyday operation.

With the variant with the means for the mechanical rubbing off of dirt in or on the basic body, the means is preferably kept reversibly detachable, so that it is separable from the key body for the purpose of being washed or cleaned itself, and can be affixed again to said key body.

The key device may have the property of a key that is insertable into a lock and/or include mechanical actuation means for effecting the opening and/or closing of the vehicle by means of wireless transmitted signals, and/or automatic detection means for recognising a pre-determined vehicle and for effecting the opening of said vehicle and/or an automatic signal transmission unit for the detection of the key device by a pre-determined vehicle. Every type of opening unit that is known and which a driver takes with them can contain the means for cleaning in or on its basic body.

In another aspect, a method for cleaning an outer element of a vehicle, in particular at least one optical element of a rear view device of the vehicle, includes:
- detecting the presence of a contamination state, in particular a pre-determined degree of contamination and/or a pre-determined type of contamination, on the element by a unit of the vehicle
- wirelessly emitting at least one signal that reports the necessity of cleaning the element to a key device, preferably a key device of the type according to the invention described above,
- receiving the warning signal by the key device, and
- transmitting an optically, acoustically and/or haptically detectable output signal, in particular by the key device, for informing a carrier or owner of said device of the necessity of cleaning the element, and
- using at least one cleaning means in or on the key device itself for cleaning the element.

The above advantages of the key device are also applicable for the described methods.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the invention or the appended claims. Further, it should be understood that any one of the features can be used separately or in combination with other features. Other systems, methods, features, and advantages of the invention will be or become apparent to one with skill in the art upon examination of the detailed description. It is intended that all such additional systems, methods, features, and advantages be included within this description, be within the scope of the present invention, and be protected by the accompanying claims.

Figure 1:
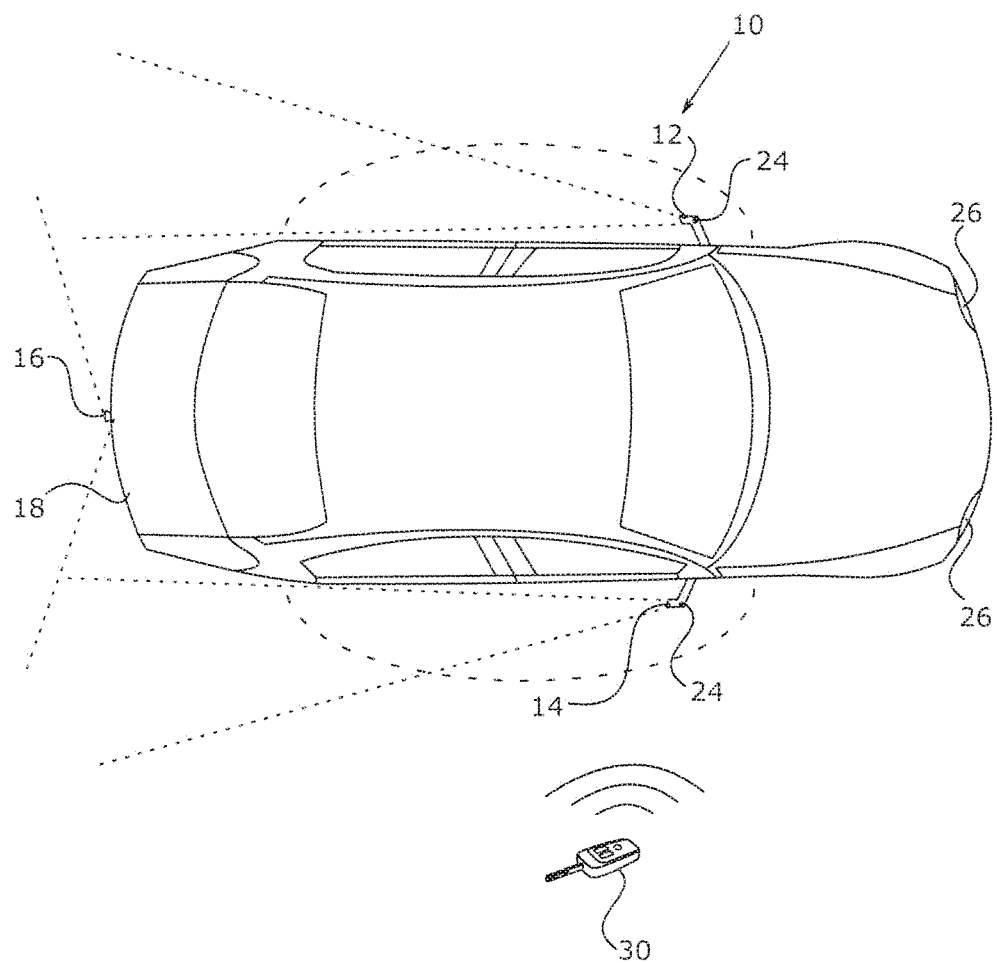
FIG. 1 is a diagram illustrating an example of a top view of a motor vehicle for which a key may be used.

A motor vehicle 10 in FIG. 1 has rear view cameras 12, 14, of which one may be arranged on the driver side and the passenger side of the motor vehicle 10. A further camera 16 is attached to the rear 18 of the motor vehicle 10 in order to transmit to the driver additional visual information when the motor vehicle 10 is driven backwards. The rear view cameras 12, 14 can be integrated in rear view mirrors or used instead of rear view mirrors. The second variant is described below without the invention being limited thereto.

The rear view cameras 12, 14 are movably designed so that they can be moved between the operating position shown in FIG. 1 and a resting position in which they are lowered behind an outer cladding of the motor vehicle 10. The signals of the cameras 12, 14, 16 are processed using a data processing unit (not shown) and are visually displayed during operation of the motor vehicle 10 on corresponding displays in the interior of the motor vehicle 10.

In an example, the data processing unit may recognize, by means of standard image processing or image evaluation methods, when a contamination of a lens (not shown) of one of the cameras 12, 14, 16 is present. The fact that contamination is present that makes cleaning necessary is recognized when a pre-determined degree of contamination and/or a pre-determined type of contamination is present. If such contamination is recognised, corresponding information can be stored in a memory of the data processing unit.

When it is recognised that the driver plans to put the vehicle into operation, for example by actuating a transponder or a key 30, or also only by touching a door handle of the motor vehicle 10, a check is made as to whether any (pre-determined or existing) contamination is present. This can be done by querying the aforementioned memory. However, it is also possible to only directly recognise contamination of the lens through image processing at this point in time.

If contamination is present, the driver is notified by means of a signal that the lens should be cleaned even before he opens a door of the motor vehicle 10 or sits down in it. This is done via a notification lamp 38 provided on the transponder or key 30 which informs the driver accordingly. In another example or in addition to this example, an indicator 24 of the vehicle 10 may light up or flash in a pre-determined manner. Further, in yet another example or in addition to the described examples, an acoustic signal can be transmitted. This may be transmitted, for example, via an external loudspeaker of the motor vehicle 10, via its horn, or via a loudspeaker or buzzer (not shown) in the key 30. Similarly, the key 30, 30' may also be made to vibrate.

In response to the signal, the driver may now clean the lens prior to starting to drive in order to guarantee safe operation of the motor vehicle 10. A cleaning element, for example a brush, a cleaning cloth, a wiper lip, a cleaning spray or similar, can be integrated into the key 30. It is also possible to provide a storage compartment for such a cleaning element in a housing or in an area close to the camera 12, 14, 16, which can be coupled to the key so that the cleaning agent is quickly and easily available to hand.

In order to make cleaning easier, the camera 12, 14, 16 may also be moved into a specified cleaning position in order to make the lens more easily accessible to the driver, for example, and make cleaning more convenient.

Figure 2:
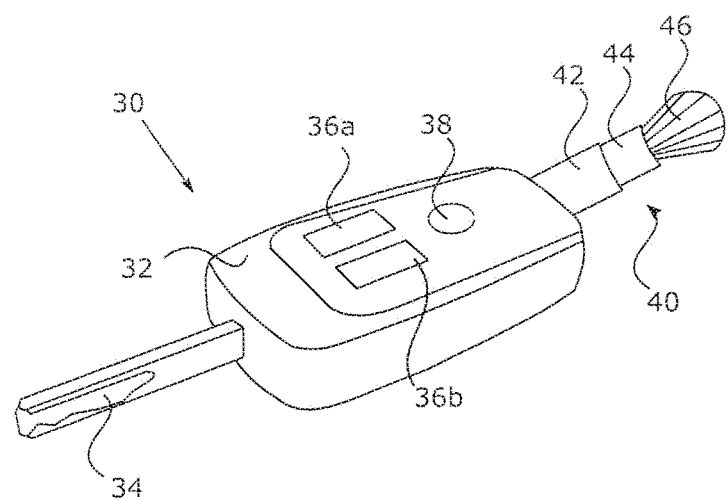
FIG. 2 is a diagram illustrating an example of a perspective view of a first embodiment of the key.

The key 30 shown in FIG. 2 includes a basic body 32 from which a lock pin 34 stands out at least at times from the mechanical closure. A push button 36a serves to open the vehicle 10, a push button 36b serves to close the vehicle, both via wireless signals, such as radio or infrared signals. The aforementioned notification lamp 38 may be embedded in the basic body 32. In addition, a loudspeaker or means for making the basic body vibrate may also be embedded in the basic body 32. With the key 30, a brush 40 can be moved out of the basic body 32. The brush 40 may include two telescopically interleaved bodies 42 and 44, whereby the second, inner telescope body 44 carries the actual brush elements 46.

Figure 3:
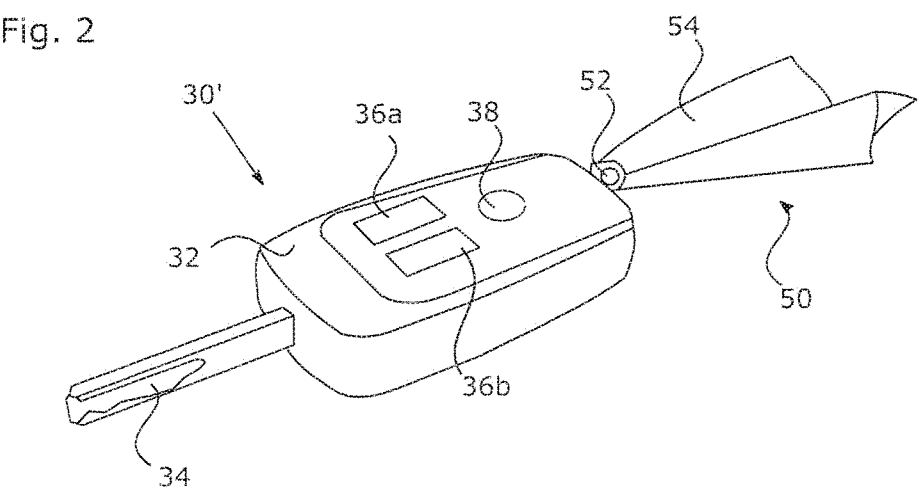
FIG. 3 is a diagram illustrating an example of a perspective view of a second embodiment of the key.

The key 30' shown in FIG. 3 includes similar elements, only instead of the brush 40, it includes a cloth body 50 that has a changing pin 52 for detachable attachment on the basic body 32 and the actual cloth 54. This can be a microfibre cloth and/or the cloth 54 can be impregnated with cleaning agents such as a foam. In another example, the cloth 50 may be hidden in the basic body 32 in the basic state and moved out by pressing onto the basic body 32 and drawn back in by spring force.

Other designs of the key are also possible. For example, the described embodiments can also be used in connection with a keyless go system or keyless entry system such as with a portable transponder. In this example, the key can also be designed as a digital key such as a smartphone with key functions.

In a similar way as described above, an additional signal can also be transmitted on the key 30 or 30' and/or the indicator 24 when an existing cleaning system for one of the cameras 12, 14, 16 requires maintenance and, for example, requires new cleaning fluid or the replacement of a wiper blade.

Further, it is also possible that after detection of contamination of the lens, a door of the motor vehicle is blocked until the dirt is removed, in order to ensure that the driver must clean the lens before they start to drive.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

LIST OF REFERENCE NUMERALS

10 Motor vehicle
12 Rear view camera
14 Rear view camera
16 Camera
18 Rear
30, 30' Key
32 Basic body
34 Lock pin
36a, 36b Pusher
38 Lamp
40 Brush
42, 44 Telescope body
46 Brush element
50 Cloth body
52 Changing pin
54 Cloth

What is claimed is:

1. A key device for at least one of opening and starting a vehicle, comprising:
   a main body;
   at least one cleaning means which is in or on the main body for cleaning an optical element of a rear view device of the vehicle;
   a receiving unit for receiving at least one wirelessly transmitted input signal emitted from the vehicle which provides information about a degree of contamination of the optical element; and
   a transmitting unit for transmitting at least one output signal which provides information about a degree of contamination of the optical element.

2. The key device according to claim 1, wherein the transmitting unit comprises at least one of a lamp, a loudspeaker, and a vibrating unit for vibrating the main body.

3. The key device according to claim 1, wherein a fluid application unit is at least partially hidden in the main body in a basic state, and is configured to be moved out of the main body at least partially, depending on an input signal, into an operating state.

4. The key device according to claim 1, wherein a fill level of the container with a cleaning fluid is configured to be determined, or a fill request is configured to be transmitted, depending on at least one of a specific fill level and a transmitting unit.

5. The key device according to claim 1, wherein the cleaning means comprises at least one mechanical means for the mechanical rubbing off of dirt comprising at least one of a cloth, a brush, and a wiper lip.

6. The key device according to claim 5, wherein the mechanical means is hidden at least in sections in the main body in a basic state and can be moved out of the main body at least partially, depending on an input signal, into an operating state.

7. The key device according to claim 5, wherein an abrasion of the mechanical means is configured to be determined, or a signal relating to the abrasion of the mechanical means is configured to be transmitted, in a form of a request for replacement via a transmitting unit.

8. The key device according to claim 5, wherein at least one of
   at least a part of the cleaning means is movable into an operating state, and
   at least a part of the cleaning means is transferable back into a basic state from the operating state.

9. The key device according to claim 1, wherein at least a part of the cleaning means is at least one of detachable from the main body and affixable onto the main body.

10. The key device according to claim 1, further comprising at least one of:
    at least one key that is insertable into a lock;
    at least one mechanical actuation means for effecting at least one of an opening and closing of the vehicle by means of wireless transmitted signals;
    a detection means for automatic recognition of a pre-determined vehicle and for effecting the opening of the pre-determined vehicle;
    a digital key comprising a smartphone with a digital key function; and
    an automatic signal transmission unit for detecting the key device by a pre-determined vehicle.

11. A method for cleaning an outer element of a vehicle comprising at least one optical element of a rear view device of a motor vehicle, with the following steps:
    detecting a contamination state comprising at least one of a pre-determined degree of contamination and a pre-determined type of contamination of the outer element;
    emitting at least one signal that is characteristic for the detected degree of contamination, comprising an input signal for a key device according to claim 1; and
    transmitting an optically, acoustically or haptically detectable output signal using the key device with a request for cleaning using the at least one cleaning means of the key device or which is connectable with the key device.

12. A key device for at least one of opening and starting a vehicle, comprising:
    a main body;
    at least one cleaning means which is in or on the main body for cleaning an optical element of a rear view device of the vehicle;
    a receiving unit for receiving at least one wirelessly transmitted input signal emitted from the vehicle which provides information about a degree of contamination of the optical element; and
    a transmitting unit for transmitting at least one output signal which provides information about a degree of contamination of the optical element,
    wherein the cleaning means comprises at least one mechanical means for the mechanical rubbing off of dirt comprising at least one of a cloth, a brush, and a wiper lip, and
    wherein at least one of
       at least a part of the cleaning means is movable into an operating state, and
       at least a part of the cleaning means is transferable back into a basic state from the operating state.

* * * * *